(12) United States Patent
Hunt et al.

(10) Patent No.: US 12,393,305 B2
(45) Date of Patent: Aug. 19, 2025

(54) METHOD AND APPARATUS FOR INTERFACING WITH A TOUCH SENSOR

(71) Applicant: Telefonaktiebolaget LM Ericsson (publ), Stockholm (SE)

(72) Inventors: Alexander Hunt, Tygelsjö (SE); Mohammed Zourob, London (CA); Andreas Kristensson, Södra Sandby (SE); Mohammed Abdulaziz, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 18/684,052

(22) PCT Filed: Aug. 31, 2021

(86) PCT No.: PCT/EP2021/074041
§ 371 (c)(1),
(2) Date: Feb. 15, 2024

(87) PCT Pub. No.: WO2023/030612
PCT Pub. Date: Mar. 9, 2023

(65) Prior Publication Data
US 2025/0004597 A1  Jan. 2, 2025

(51) Int. Cl.
*G06F 3/041* (2006.01)
*G06F 3/044* (2006.01)

(52) U.S. Cl.
CPC ............ *G06F 3/0418* (2013.01); *G06F 3/044* (2013.01)

(58) Field of Classification Search
CPC .............................. G06F 3/0418; G06F 3/044
See application file for complete search history.

(56) References Cited

U.S. PATENT DOCUMENTS

| 8,022,317 | B2 | 9/2011 | Ely |
| 2011/0175835 | A1 | 7/2011 | Wang |
| 2012/0075205 | A1* | 3/2012 | Huang ................ G06F 3/04166 345/173 |

(Continued)

FOREIGN PATENT DOCUMENTS

| EP | 2372504 A2 | 10/2011 |
| KR | 101582597 B1 | 1/2016 |
| KR | 102081809 B1 | 2/2020 |

OTHER PUBLICATIONS

An, Jae-Sung, et al., "A 3.9-kHz Frame Rate and 61.0-dB SNR Analog Front-End IC With 6-bit Pressure and Tilt Angle Expressions of Active Stylus Using Multiple-Frequency Driving Method for Capacitive Touch Screen Panels", IEEE Journal of Solid-State Circuits, vol. 53, No. 1, Jan. 2018, 17 pages.

*Primary Examiner* — Premal R Patel
(74) *Attorney, Agent, or Firm* — Murphy, Bilak & Homiller, PLLC

(57) ABSTRACT

An apparatus (40) and method (700) provide power-efficient reading of a touch sensor (10) by performing transform-based reading of the touch sensor (10) according to a read configuration (80) that accounts for touch-surface areas that are indicated as touch targets (68) for receiving touch input. Advantages such as power savings and more robust touch detection flow from the intelligent selection of which sensing lines (14) of the touch sensor (10) to excite and which excitation frequencies (52) to use for exciting them.

22 Claims, 9 Drawing Sheets

(56) References Cited

U.S. PATENT DOCUMENTS

| | | |
|---|---|---|
| 2013/0176270 A1 | 7/2013 | Cattivelli et al. |
| 2015/0035768 A1 | 2/2015 | Shahparnia et al. |
| 2015/0091858 A1 | 4/2015 | Rosenberg et al. |
| 2015/0091859 A1 | 4/2015 | Rosenberg et al. |
| 2015/0309610 A1 | 10/2015 | Rabii et al. |
| 2016/0162011 A1 | 6/2016 | Verma et al. |
| 2016/0195990 A1 | 7/2016 | Han et al. |
| 2016/0259467 A1* | 9/2016 | Nayyar ............. G06F 3/041661 |
| 2016/0378251 A1 | 12/2016 | Aznoe |
| 2017/0199022 A1 | 7/2017 | Anderson et al. |
| 2017/0199626 A1 | 7/2017 | D'Souza |
| 2017/0344174 A1 | 11/2017 | Pant et al. |
| 2018/0307376 A1 | 10/2018 | Citta |
| 2018/0329563 A1 | 11/2018 | Han et al. |
| 2019/0050102 A1 | 2/2019 | Johnson et al. |
| 2019/0138148 A1* | 5/2019 | Kwon ................... G06F 3/0416 |
| 2020/0050320 A1 | 2/2020 | Yang et al. |
| 2020/0326795 A1 | 10/2020 | Chang et al. |
| 2021/0191562 A1* | 6/2021 | Han .................... G06F 3/04182 |
| 2022/0075485 A1 | 3/2022 | Citta |

* cited by examiner

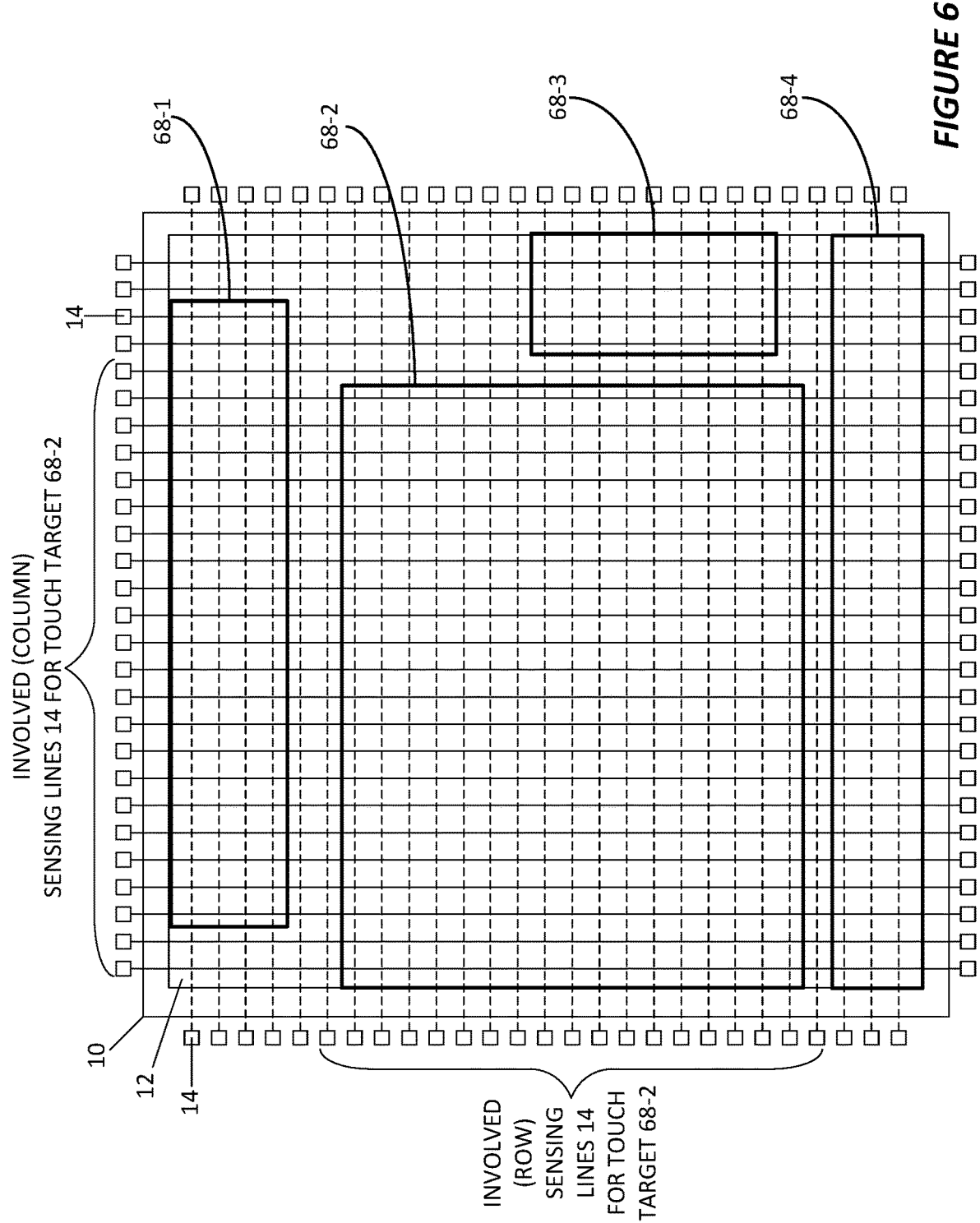

METHOD AND APPARATUS FOR INTERFACING WITH A TOUCH SENSOR

TECHNICAL FIELD

The invention relates to touch sensors and particularly relates to interfacing with touch sensors.

BACKGROUND

Touch sensors, such as capacitive touchscreens find widespread use, in everything from laptops and other personal computing devices, such as smartphones and tablets, to banking terminals, point-of-sale terminals, etc. Interfacing with touch sensors imposes several challenges, such as balancing the amount and complexity of the interface circuitry against performance and cost. Among other things, "performance" refers to the time required for reading the touch sensor to determine whether or where the touch surface of the touch sensor is being touched, as well as the power consumption associated with detecting touch inputs.

While PCT/EP2020/086794 discloses an advantageous approach to reading touch sensors using frequency-domain techniques, the growing sophistication of touch-based electronics and the software applications they run only increases the challenges of interfacing with touch sensors. Particular challenges exist with respect to multi-application software environments and the need to balance a user's quality of experience with respect to touch-based control against the desire to reduce the power cost and circuit complexity associated with touch-sensor interfacing.

SUMMARY

An apparatus and method provide power-efficient reading of a touch sensor by performing transform-based reading of the touch sensor according to a read configuration that accounts for touch-surface areas that are indicated as touch targets for receiving touch input. Advantages such as power savings and more robust touch detection flow from the intelligent selection of which sensing lines of the touch sensor to excite and which excitation frequencies to use for exciting them.

In one embodiment, a method performed by an apparatus comprises receiving host signaling from host processing circuitry, indicating touch targets for respective software applications running on a host system, each touch target being a respective area of a touch surface of a touch sensor. The method further includes determining a read configuration for transform-based reading of the touch sensor, in dependence on the indicated touch targets. Determining the read configuration includes selecting sensing lines of the touch surface to be excited for detecting touch inputs to the touch targets and selecting excitation frequencies to be used for exciting the selected sensing lines. Still further, the method includes reading the touch sensor according to the read configuration.

In another embodiment, an apparatus is configured for interfacing with a touch sensor, with the apparatus comprising interface circuitry and processing circuitry. The processing is configured to receive, via the interface circuitry, host signaling from host processing circuitry of a host system, the host signaling indicating touch targets for respective software applications running on the host system, each touch target being a respective area of a touch surface of the touch sensor. The processing circuitry is further configured to determine a read configuration for transform-based reading of the touch sensor, in dependence on the indicated touch targets, including selecting sensing lines of the touch surface to be excited for detecting touch inputs to the touch targets, and selecting excitation frequencies to be used for exciting the selected sensing lines. Still further, the processing circuitry is configured to read the touch sensor based on controlling reading circuitry according to the read configuration, the reading circuitry integrated or associated with the processing circuitry.

Another embodiment comprises an apparatus that is configured for interfacing with a touch sensor, with the apparatus comprising a set of processing units or modules. The modules include a host interface module that is configured to receive host signaling from host processing circuitry of a host system, the host signaling indicating touch targets for respective software applications running on the host system, each touch target being a respective area of a touch surface of the touch sensor. Further modules include a configuration module that is configured to determine a read configuration for transform-based reading of the touch sensor, in dependence on the indicated touch targets, including selecting sensing lines of the touch surface to be excited for detecting touch inputs to the touch targets, and selecting excitation frequencies to be used for exciting the selected sensing lines. Still further, a sensor read module is configured to read the touch sensor based on controlling reading circuitry according to the read configuration.

Another embodiment comprises a computer-readable medium storing computer program instructions that when executed by one or more processors of an apparatus configure the apparatus for interfacing with a touch sensor. Particularly, the computer program instructions include instructions for configuring the apparatus to receive host signaling from host processing circuitry of a host system, the host signaling indicating touch targets for respective software applications running on the host system, each touch target being a respective area of a touch surface of the touch sensor. Further included are instructions for configuring the apparatus to determine a read configuration for transform-based reading of the touch sensor, in dependence on the indicated touch targets, including selecting sensing lines of the touch surface to be excited for detecting touch inputs to the touch targets, and selecting excitation frequencies to be used for exciting the selected sensing lines. Still further, instructions are included for configuring the apparatus to read the touch sensor based on controlling reading circuitry according to the read configuration.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIG. 6 is a block diagram of further example details for a touch sensor.

DETAILED DESCRIPTION

Figure 1:
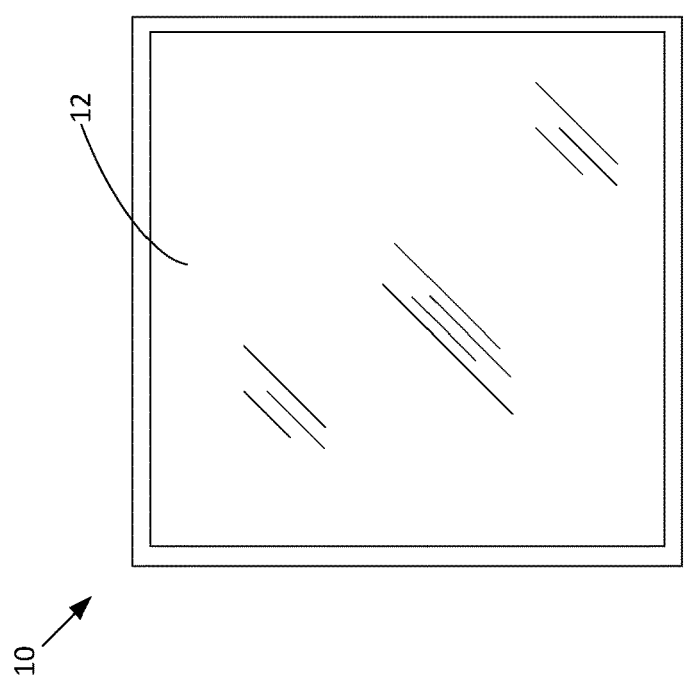

FIG. 1 illustrates a typical touch sensor 10 having a touch surface 12 configured for sensing touch inputs from a user (not shown). Various technologies are available for implementation of the touch sensor 10, with one example being implementation of the touch sensor 10 as a capacitive touchscreen. An example arrangement involving capacitive touch sensor technology includes a capacitive touchscreen comprising a substrate with an X-Y grid of capacitors formed thereon or therein and arranged as intersecting screen columns and screen rows.

Figure 2:
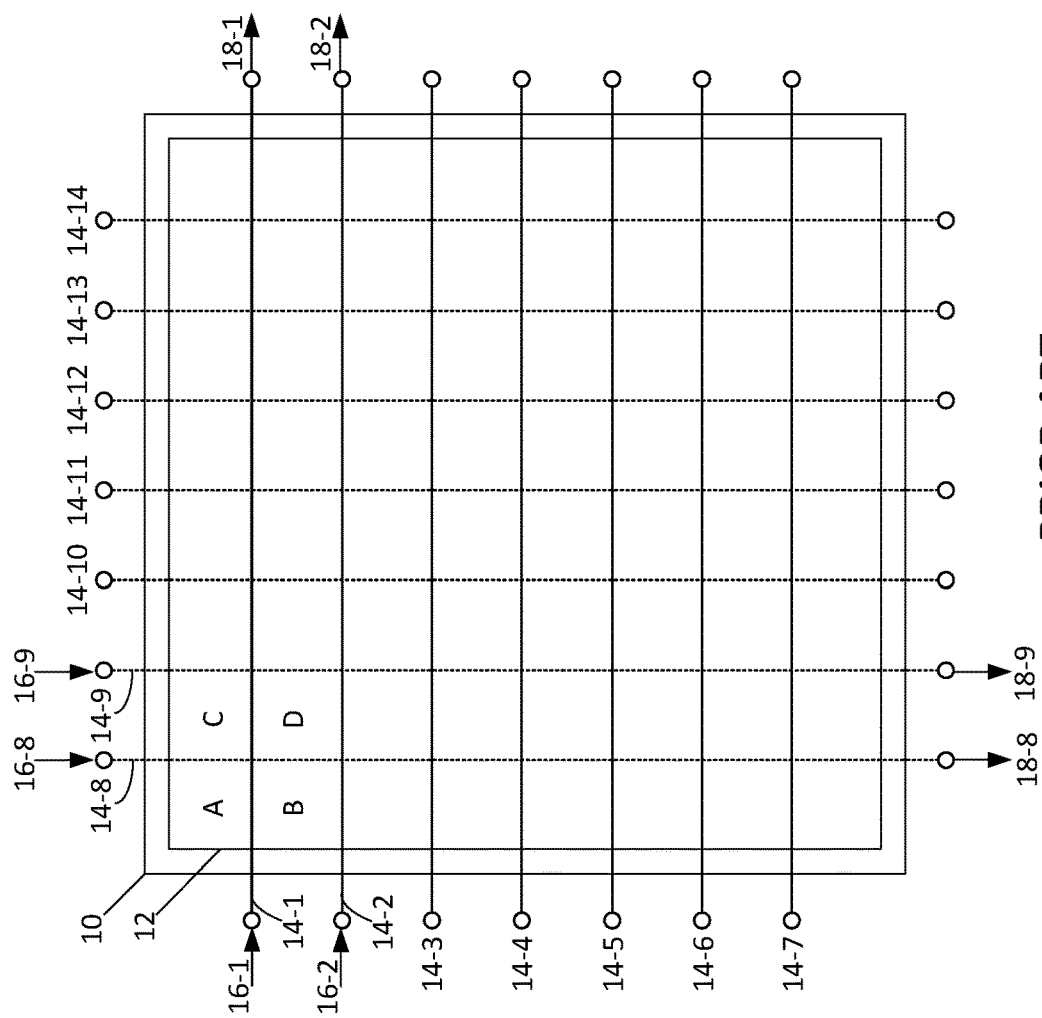
FIGS. 1 and 2 are block diagrams of an example touch sensor having a touch surface spanned by sensing lines.

Regardless of the sensing technology used, FIG. 2 depicts a known, example arrangement where "sensing lines" 14 span the touch surface 12 for detecting single-point touches or multi-point touches, e.g., "pinches", "swipes", or other "gesture" inputs. Fourteen sensing lines 14-1 through 14-14 appear in the example depiction, with lines 14-1 through 14-7 arranged in a "row" orientation and lines 14-8 through 14-14 arranged in a column orientation. Other crisscrossing arrangements may be used, equivalently, and this disclosure uses the reference number "14" without suffixing to refer to any given one or more sensing lines, unless suffixing is needed for clarity. Implementations of the touch sensor 10 may include many sensing lines 14 crisscrossing the touch surface 12, with the density or spacing of adjacent sensing lines 14 defining the maximum resolution at which touch points can be determined within the coordinates of the touch surface 12.

Detecting whether a touch input is present or absent within the region of the touch surface 12 through which a particular sensing line 14 runs involves applying an excitation signal 16 to one end of the sensing line 14 and measuring or otherwise evaluating the resulting sensing signal 18 output from the other end of the sensing line 14. For example, the voltage and/or another characteristic of a sensing signal 18 varies in dependence on whether there is a touch input within the region of the touch surface 12 that corresponds to the sensing line 14 outputting the sensing signal 18. For example, detecting touch inputs in any one or more of the regions of the touch surface 12 labeled as "A", "B", "C", and "D" in the diagram involves applying excitation signals 16 at least to the sensing lines 14 that run through or bound those regions, and evaluating the resulting sensing signals 18.

Using the suffixing illustrated in FIG. 2, sensing lines 14-1, 14-2, 14-8, and 14-9 run through or bound the regions A, B, C, and D. Applying excitation signal 16-1 to the sensing line 14-1 yields the sensing signal 18-1, applying excitation signal 16-2 to the sensing line 14-2 yields the sensing signal 18-2, applying excitation signal 16-8 to the sensing line 14-8 yields the sensing signal 18-8, and applying excitation signal 16-9 to the sensing line 14-9 yields the sensing signal 18-9. Detecting whether touch inputs are present in any one or more of the regions A, B, C, and D involves jointly evaluating the sensing signals 18-1, 18-2, 18-8, and 18-9. For example, a touch input within region A affects, or most strongly affects, sensing signals 18-1 and 18-8. Of course, the figure depicts a coarse arrangement of sensing lines 14 and in a practical application, there may be a much higher density of sensing lines 14 crisscrossing the regions A, B, C, and D.

"Transform-based reading" of touch sensors 10 is of particular interest herein. Transform-based reading refers to the use of frequency-domain transformations for detecting touch inputs to a touch sensor 10. Specifically, transform-based reading involves using analog frequency tones as the excitation signals 16, which results in the sensing signals 18 being corresponding frequency tones having an amplitude or other signal characteristic that depends on the presence or absence of touch inputs. Applying a frequency-domain transform to such sensing signals yields frequency-domain sensing values corresponding to the frequency tone(s) of the excitation signal(s) in use. A distinguishing feature of transform-based reading is that touch detection is based on obtaining and evaluating these frequency-domain sensing values.

One advantage of transform-based reading is that multiple simultaneously generated sensing signals 18 can be combined and transformed together, to produce resulting frequency-domain sensing values in frequency bins or spectral positions corresponding to the frequency tones of the excitation signals 16. Consequently, the involved device or system need not generate and perform measurements on the sensing signals one at a time, such as would be required in more conventional "scanning" arrangements that use a multiplexed analog-to-digital converter to measure the voltage of each excitation signal.

Figures 3, 4:
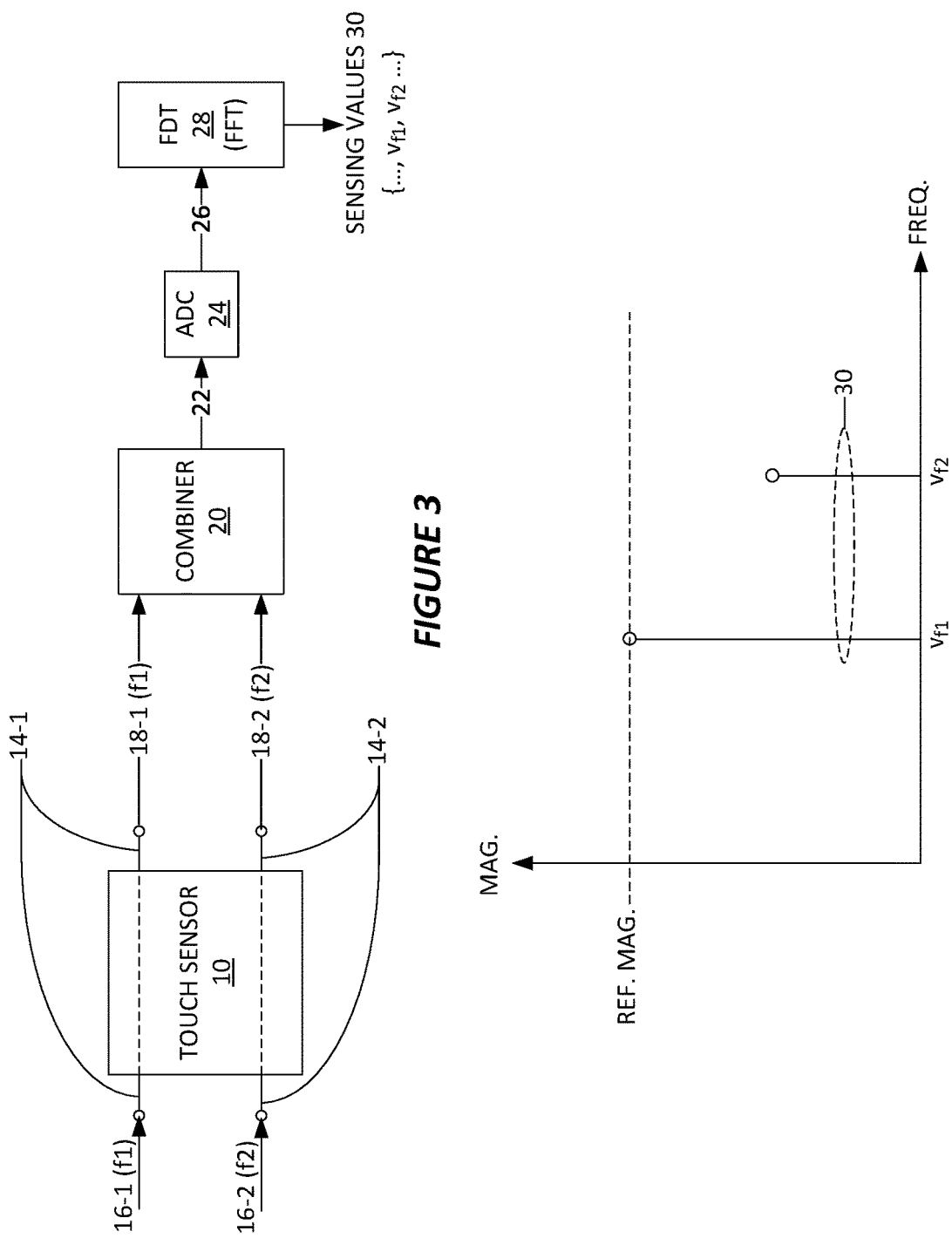
FIG. 3 is a block diagram of circuitry configured for performing a transform-based reading a touch sensor, according to one embodiment.
FIG. 4 is a plot of example frequency-domain values produced by the circuitry of FIG. 3, for detecting touch inputs.

FIG. 3 illustrates a simplified example of transform-based reading that is based on two sensing lines 14-1 and 14-2. A first excitation signal 16-1 at frequency f1 is applied to one end of the sensing line 14-1 and results in a first sensing signal 18-1 at frequency f1 being output from the other end of the sensing line 14-1. Likewise, applying a second excitation signal 16-2 at frequency f2 to one end of the sensing line 14-2 results in a second sensing signal 18-2 at frequency f2 being output from the other end of the sensing line 14-2. Assuming simultaneous application of the first and second excitation signals 16-1 and 16-2, the resulting two sensing signals 18-1 and 18-2 are combined in the analog domain via a combiner 20, to produce a combined sensing signal 22 that includes frequency-separable signal components corresponding to the first and second sensing signals 18-1 and 18-2.

Digitizing the combined sensing signal 22 in analog-to-digital conversion (ADC) circuitry 24, along with any filtering and amplification, yields a digitized combined sensing signal 26. Frequency domain transform (FDT) circuitry 28 performs a frequency-domain transform, such as a Discrete Fourier Transform (DFT), on the digitized combined sensing signal 26 to obtain frequency-domain sensing values 30 corresponding to excitation-signal frequencies contained in the digitized combined sensing signal 26. The FDT processing may also detect spurious or unwanted values but values not corresponding to the excitation frequencies included in the digitized combined sensing signal 26 can be ignored. Thus, in the example of FIG. 3, the frequency-domain sensing values 30 that are of interest for touch detection include a value $v_{f1}$ corresponding to the first sensing signal 18-1 at f1, and a value $v_{f2}$ corresponding to the second sensing signal 18-2 at f2.

FIG. 4 illustrates an example touch-detection scenario that assumes the presence of a touch input along the region of the touch surface 12 corresponding to the second sensing line 14-2 and the absence of a touch input along the region of the touch surface 12 corresponding to the first sensing line 14-1. With no touch inputs changing the capacitance or other electrical attribute of the first sensing line 14-1, the corresponding sensing value 30 for $v_{f1}$ is at a nominal or reference magnitude (within some tolerance range). Contrastingly, with a touch input changing the capacitance or other electrical attribute of the second sensing line 14-2, the corresponding sensing value 30 for $v_{f2}$ exhibits a reduced magnitude, thus indicating the presence of a touch input somewhere along the region of the touch surface 12 corresponding to the second sensing line 14-2.

When one set of sensing lines 14 runs in a first direction of the touch surface 12 (e.g., row-wise) and another set runs in a second direction of the touch surface 12 (e.g., column-wise), a touch event generally affects one or more sensing lines 14 that run in the first direction and one or more sensing lines 14 that run in the second direction. Thus, "locating" a touch event, i.e., determining where the touch point is on the touch surface 12, may be performed by correlating the sensing value(s) 30 that are associated with the first direction and have magnitudes that exhibit the presence of a touch input with the sensing value(s) 30 that are associated with the second direction and have magnitudes that exhibit the presence of a touch input.

Figure 5:
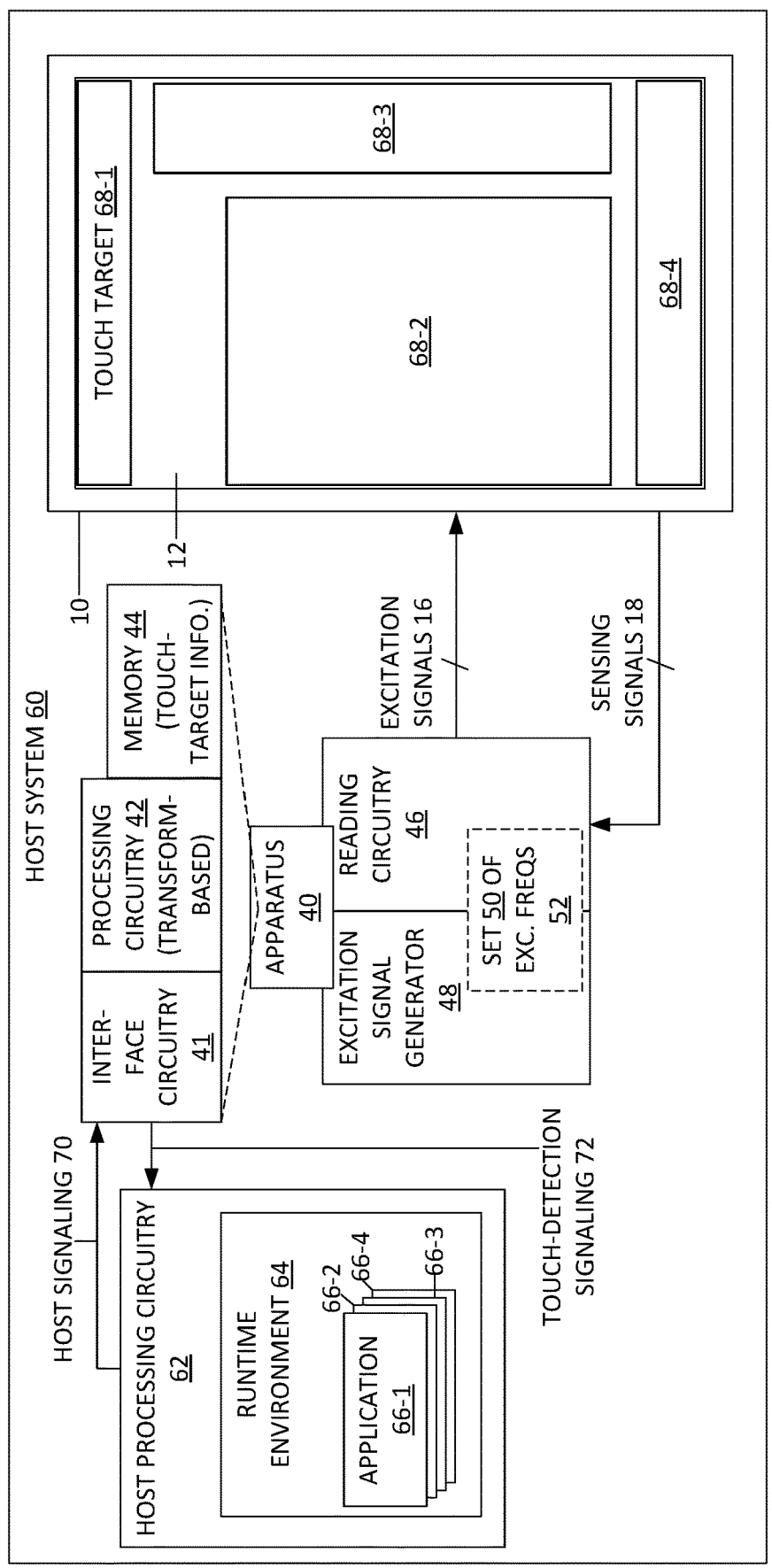
FIG. 5 is a block diagram of a host system that includes an apparatus configured for interfacing with a touch sensor, according to an embodiment.

FIG. 5 illustrates an apparatus 40 that is configured to perform transform-based reading of a touch sensor 10. The apparatus 40 comprises an integrated circuit (IC) in one or more embodiments. In at least one example implementation, the apparatus 40 comprises processing circuitry 42 configured for transform-based reading of the touch sensor 10 and includes or is associated with memory 44, such as for holding "touch target" information—i.e., information about which regions of the touch surface 12 of the touch sensor 10 are targets for touch detection. Other information that may be held in the memory 44 on a "live" or running basis is which excitation frequencies are available to use for excitation signals 16. There may be a predefined or dynamically-determined set of available excitation frequencies.

For example, there may be a maximum of N excitation frequencies that can be generated/used simultaneously, going from a minimum frequency to a maximum frequency in uniform frequency steps, where N is an integer. Further, in one or more embodiments that evaluate the viability or desirability of individual excitation frequencies for use, e.g., in embodiments that assess the noise or interference experienced on individual excitation frequencies, there may be a dynamically-defined set of available excitation frequencies, e.g., those excitation frequencies having measured noise or interference below some defined threshold, which may be predetermined or dynamically-computed as a function of the particular sensing-reading requirements in play.

The apparatus 40 further includes or is associated with reading circuitry 46 that is configured to apply excitation signals 16 to the touch sensor 10 and detect or otherwise sense corresponding sensing signals 18 from the touch sensor 10. Characteristics defining the reading circuitry 46 include its ability to apply multiple excitation signals 16 simultaneously to the touch sensor 10 and, correspondingly, and form and digitize a combined sensing signal from the multiple sensing signals 18 that are correspondingly output from the touch sensor 10. The digitized combined sensing signal may then be transformed into frequency-domain values by the reading circuitry 46 or by the processing circuitry 42, which in at least one embodiment integrates all or part of the reading circuitry 46. However implemented, the reading circuitry 46 is configured to be controlled by the processing circuitry 42, to select which sensing lines 14 of the touch surface 12 of the touch sensor 10 are excited during a read of the touch sensor 10, and further select which excitation frequencies are used to excite those sensing lines 14.

An excitation signal generator 48 generates analog frequency tones for use as the excitation signals 16. In an example embodiment, the excitation signal generator 48 is controllable by the processing circuitry 42 to generate or otherwise output at any time specific selected frequencies from a set 50 of N excitation frequencies 52. The value N may equal the total number of sensing lines 14 of the touch sensor 10 or may be some fraction of that total and the set 50 of excitation frequencies 52 may be predefined, e.g., covering a defined spectrum going from a lowest excitation frequency 52 to a highest excitation frequency 52 and with a defined spacing. In at least one embodiment, N is an integer that at least equals the maximum number of sensing lines 14 to be excited simultaneously in any given read of the touch sensor 10, e.g., the maximum number of "columns" or "rows" of the touch sensor 10.

The apparatus 40 provides an intelligent touch-sensor interface for host processing circuitry 62 of a host system 60 that incorporates the apparatus 40. Example host systems 60 include personal computing devices such as smartphones, tablets, and laptops, but the host system 60 may be essentially any electronic system that incorporates a touch sensor 10 for user interaction. In an example of such interaction, the host processing circuitry 62 provides a runtime environment 64 in which one or more software applications 66 may be running at any given time. Of course, the applications 66 running may change over time and the term "application" in this context has broad meaning. For example, one or more of the applications 66 may be low-level operating-system applications or functions that run in parallel or in a background sense relative to any higher-level applications that may be executing in the runtime environment 64.

An advantageous illustration of the intelligent interfacing provided to the host processing circuitry 62 by the apparatus 40 arises in the context of touch targets 68, where FIG. 5 depicts four touch targets 68-1, 68-2, 68-3, and 68-4, as a non-limiting example. At any given time, an individual application 66 in the runtime environment 64 may use or be interested only in a particular region or regions of the touch surface 12. For example, a given application 66 may display only one or a few touch controls at any time and is therefore "interested" only in touch inputs directed to such regions, which are touch targets 68 for that respective application 66.

Of course, the number of applications 66 running and the number and location of the corresponding touch targets 68 may vary dynamically, as applications 66 are launched or terminated on the host system 60, or as the "focus" changes between running applications 66. Thus, host signaling 70 incoming from the host processing circuitry 62 changes dynamically, to indicate the touch targets 68 currently of interest and the apparatus 40 in one or more embodiments maintains a data structure in the memory 44 that represents the "current set" of touch targets 68 to be read on the touch sensor 10 by the apparatus 40. For example, the apparatus 40 tracks or otherwise remembers which touch targets 68 are in use at any given time.

Particularly, the apparatus 40 is configured to determine a "read configuration" to use for reading the touch sensor 10, in dependence on the number and arrangement of the touch targets 68 to be read. In at least one embodiment, the apparatus 40 further bases the read configuration on touch-detection requirements associated with the touch targets 68. The term "touch-detection requirements" at least refers to one or both of a "responsiveness" requirement and a "resolution" requirement. Further, in at least one embodiment, the read configuration depends on determining "available" excitation frequencies 52. For example, out of a set 50 of excitation frequencies 52, noise measurements may indicate that one or more of them are too noisy for use or that one or more of them are preferred for use.

If the number of available excitation frequencies 52 is less than the number of separate excitation frequencies 52 needed in the particular reading scenario at issue, the apparatus 40 may perform the read as successive, related read operations that reuse one or more of the available excitation frequencies 52. For example, if there are fourteen row-oriented sensing lines 14 to read and all require distinction for touch-resolution purposes, and there are only ten available excitation frequencies, the apparatus 40 may read a first subset of the sensing lines 14 in one operation and then read a remaining subset of the sensing lines 14 in a successive operation, with the two operations together being considered part of the same overall "reading" of the touch sensor 10.

Although the evaluation of available excitation frequencies 52 may be dynamic, i.e., the prevailing noise conditions may change, a possible source of narrowband noise that affects one or more excitation frequencies 52 but not others is clock or switching noise present in the host system 60. Embodiments of the apparatus 40 that assess the presence or level of narrowband noise with respect to individual excitation frequencies offer, among other advantages, the ability to tailor or adapt the excitation frequencies 52 used for touch-sensor reading to the noise environment experienced in the host system 60.

The responsiveness requirement indicates an allowable or maximum touch-detection latency for a respective touch target 68 and may be understood as dictating read-cycle timing, permissible excitation-signal voltages, etc. The resolution requirement indicates an allowable or minimum touch-detection resolution for a respective touch target 68. Further, touch-detection requirements may include touch-type requirements, e.g., information about the nature of the touch inputs to be recognized, such as single touches, multiple touches, swipes, pinches, or other gesture-detection.

As an example of using touch-type requirements, the apparatus 40 may decide on the need for higher or lower touch-detection resolution or more or less responsive touch detection, in dependence on whether a given touch target 68 requires high detection speed, e.g., in case swipe detection is needed. In at least one embodiment, the host signaling 70 indicates respective touch targets 68, e.g., where each touch target 68 is expressed in relative or absolute coordinates that the apparatus 40, if necessary, translates into X-Y coordinates of the touch surface 12. Corresponding information provided via the host signaling 70 includes, in one or more embodiments, touch-detection requirement information for the respective touch targets 68. If such information is not provided, the apparatus 40 in one or more embodiments assumes default touch-detection requirements.

FIG. 6 provides a working basis for understanding touch-detection resolution in the context of transform-based reading of the touch sensor 10. Reading any region of the touch surface 12 at the "maximum" resolution requires the apparatus 40 to obtain a unique frequency-domain sensing value 30 for every sensing line 14 that is "involved" with that region. A particular sensing line 14 of the touch surface 12 is considered as being "involved" with a particular region of the touch surface 12 if it passes through the region or bounds the region, i.e., runs adjacent to the boundary of the region.

If all involved sensing lines 14 are simultaneously excited and sensed, the apparatus 40 must use a different excitation frequency 52 for each one of the involved sensing lines 14, to obtain a separate frequency-domain sensing value 30 for each involved sensing line 14. As an alternative, in one or more embodiments where the sensing lines 14 are arranged in crisscrossing arrangements, e.g., one set running in a first direction and another set running in another direction, such as row/column directions, the apparatus 40 may read each set of sensing lines 14 separately and, therefore, may reuse excitation frequencies 52 as between the respective sets of sensing lines 14. Indeed, with buffering of digitized sample values obtained from sensing signals 18 or combined sensing signals 26, the apparatus 40 may excite successive subsets of sensing lines 14 from an overall set to be excited and save the frequency-domain sensing values 30 obtained from each subset excitation, with excitation frequencies 52 reused across the subsets.

Consider a scenario where the touch target 68-2 shown in FIG. 6 logically functions as a single large control button, and where the application 66 that "owns" the touch target 68-2 is concerned only with whether the control button is or is not pressed. In such cases, the apparatus 40 in at least one embodiment intelligently adjusts the read configuration to allow for reading the touch target 68-2 at a lower resolution, which may save significant power. Reducing touch-detection resolution means exciting fewer than all involved sensing lines 14 or using fewer excitation frequencies 52 than there are excited sensing lines 14, or both. For example, if the touch target 68-2 logically constitutes a single control button, the apparatus 40 may use the same excitation frequency 52 to excite all the row-wise sensing lines 14 that are involved with the touch target 68-2 and it may use a single excitation frequency 52 to excite all of the column-wise sensing lines 14 that are involved with the touch target 68-2.

In addition to, or as an alternative to, exciting multiple involved sensing lines 14 with the same excitation frequency 52, the apparatus 40 in one or more embodiments reads a region of the touch surface 12 at a reduced resolution by exciting fewer than all involved sensing lines 14. For example, the apparatus 40 excites every other one of the involved sensing lines 14, every third one of the involved sensing lines 14, etc. Reducing the number of excitation frequencies 52 used to read a region of the touch surface 12 or reducing the number of sensing lines 14 that are excited for the read offers multiple advantages, including reduced power consumption, not only with respect to power expended in the touch sensor 10, but also with respect to power expended by the apparatus 40 for frequency-domain processing.

Of course, there may be gradations of resolution reduction used by the apparatus 40. For example, the touch target 68-2 may not need high touch-detection resolution per se, but the host signaling may indicate its use for swipe detection or other type of gesture-based input. Correspondingly, the apparatus 40 may subdivide the touch target 68-2 into several macro bands, such as macro rows or macro columns or bands, where each macro band encompasses two or more sensing lines, and where the apparatus 40 uses a different excitation frequency for each macro row or column, to support swipe detection.

With respect to reading-performing touch detection-any touch target 68, there will be some number of involved sensing lines 14, according to the above definition of "involved". Then, depending upon the resolution requirements, the apparatus 40 may choose to excite fewer than all the involved sensing lines 14 and may choose to excite more than one of the involved sensing lines 14 simultaneously, using the same frequency. Therefore, with respect to reading any particular touch target 68, there will be one or more "excited" sensing lines 14, meaning sensing lines 14 to which the apparatus 40 applies an excitation signal, and there will be one or more excitation frequencies 52 used for that excitation.

Consider a generalized example of reading a given touch target 68 where there are ten involved sensing lines 14. Reading the given touch target 68 at full resolution requires obtaining a separate sensing value 30 for each involved sensing line 14. Energizing only a subset of the involved sensing lines 14 reduces the read resolution; similarly, simultaneously exciting two or more of the involved sensing lines 14 means that those two or more sensing lines 14 will be represented by the same sensing value 30 in the frequency domain, therefore reducing touch resolution.

In this regard, one may view the same excitation frequency 52 being applied to multiple sensing lines 14 as the "same" excitation signal 16 being applied to them, or one may view each one of the multiple sensing lines 14 as having its own respective excitation signal 16, with all such excitation signals 16 being at the same frequency. The more correct one of these two views depends on lower-level implementation details of excitation-signal generation and multiplexing or distribution. Such details are not germane to the underlying principles.

A further complication handled by the apparatus 40 involves reading "interdependencies" between respective touch targets 68. For example, consider a scenario where the touch target 68-1 requires full-resolution reading, meaning that the apparatus 40 must obtain a separate frequency-domain sensing value for each sensing line 14 involved with the touch-target 68-1. Because the touch target 68-1 spans most of the column-oriented sensing lines 14 in the example of FIG. 6, the apparatus 40 is obligated to use full-resolution excitation for the column-oriented sensing lines 14 involved with the touch target 68-1, even though other touch targets 68 "below" the touch target 68-1 may not need full resolution. Any touch targets 68 that share involved sensing lines 14 are interdependent in the sense that the apparatus 40 must determine a read configuration that satisfies the most demanding touch-detection attribute(s) associated with the shared sensing lines 14.

The apparatus 40 in one or more embodiments maintains a read configuration with respect to the touch sensor 10 and performs corresponding transform-based reading of the touch sensor 10 dynamically, according to changing host signaling 70 incoming to the apparatus 40. For example, the apparatus 40 maintains one or more data structures in the memory 44 that reflect the current set of touch targets 68 and the touch-detection requirements corresponding to each touch target 68. Touch-detection requirements may be default requirements, e.g., full-resolution with a defined read-cycle timing or may be specified in the host signaling 70. The read configuration used by the apparatus 40 dynamically reflects changes in the touch targets 68 and the corresponding touch-detection requirements.

Figure 7:
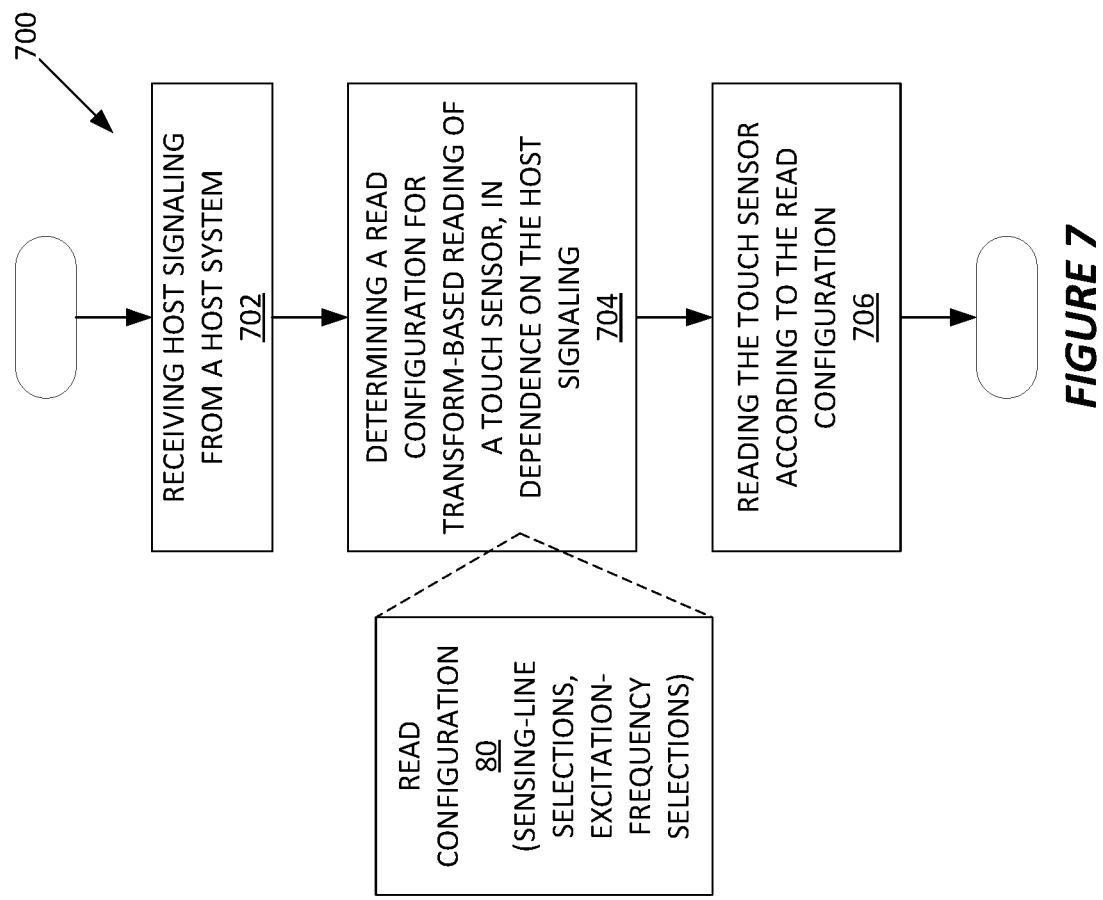
FIG. 7 is a logic flow diagram of a method of reading a touch sensor, according to an embodiment.

FIG. 7 illustrates a method 700 performed by an apparatus 40, where the method 700 includes receiving (Block 702) host signaling 70 from host processing circuitry 62, indicating touch targets 68 for respective software applications 66 running on a host system 60, each touch target 68 being a respective area of a touch surface 12 of a touch sensor 10. The method 700 further includes the apparatus 40 determining (Block 704) a read configuration 80 for transform-based reading of the touch sensor 10, in dependence on the indicated touch targets 68, including selecting sensing lines 14 of the touch surface 12 to be excited for detecting touch inputs to the touch targets 68, and selecting excitation frequencies 52 to be used for exciting the selected sensing lines 14. Method operations further include the apparatus 40 reading (Block 706) the touch sensor 10 according to the read configuration 80.

Receiving (Block 702) the host signaling 70 comprises, for example, receiving touch-target indications on a per-application basis, for the respective software applications 66 running on the host system 60. Correspondingly, determining (Block 704) the read configuration 80 with respect to such host signaling 70 comprises determining the read configuration 80 according to an aggregation of indicated per-application touch targets 68 received over time.

Receiving (Block 702) the host signaling 70 in other instances or in another embodiment comprises receiving changing indications of touch targets 68. Determining (Block 704) the read configuration 80 with respect to such host signaling 70 comprises determining the read configuration 80 dynamically, responsive to the changing indications of touch targets 68.

Receiving (Block 702) the host signaling 70 in other instances or in another embodiment comprises receiving indications from the host processing circuitry 62 regarding touch targets 68 currently in use by software applications 66 running on the host system 60. Determining (Block 704) the read configuration 80 with respect to such host signaling 70 comprises determining the read configuration 80 according to the touch targets 68 currently in use.

Selecting the sensing lines 14 of the touch surface 12 to be excited includes, in one or more embodiments, selecting all sensing lines 14 involved with the touch targets 68 or selecting fewer than all involved sensing lines 14, in dependence on touch-resolution requirements associated with respective ones of the touch targets 68 and a relative positioning of the touch targets 68 on the touch surface 12.

Selecting the excitation frequencies 52 to be used for exciting the selected sensing lines 14 comprises, in one or more embodiments, selecting as many excitation frequencies 52 as there are selected sensing lines 14 to be simultaneously excited, or selecting fewer excitation frequencies 52 than there are selected sensing lines 14 to be simultaneously excited, in dependence on touch-resolution requirements associated with respective ones of the touch targets 68 and a relative positioning of the touch targets 68 on the touch surface 12.

At least one embodiment includes identifying "available" excitation frequencies 52, e.g., based on measuring noise present in sensing signals 18 generated using respective excitation frequencies 52 from a set 50 of excitation frequencies. An "available" frequency 52 is one that has measured noise below a defined noise threshold, which may be an absolute threshold, or one determined on a relative basis. Choosing which excitation frequencies 52 to use or choosing how many different excitation frequencies 52 to use is conditioned on how many and which ones of the excitation frequencies 52 are available.

Determining the read configuration 80 in one or more embodiments comprises determining it in further dependence on touch-detection requirements associated with the touch targets 68. The touch-detection requirements in this regard include at least one of touch-resolution requirements, touch-responsive requirements, or touch-type requirements.

Selecting the excitation frequencies 52 to be used for exciting the selected sensing lines 14 comprises, in one or more embodiments, choosing individual excitation frequencies 52 from among a set 50 of excitation frequencies 52, in dependence on noise or interference measurements associated with respective ones of the excitation frequencies 52 in the set 50 of excitation frequencies 52. Correspondingly, in at least one embodiment, the method 700 includes measuring noise or interference present in sensing signals 18 to obtain the noise or interference measurements, the sensing signals 18 being output from respective sensing lines 14 of the touch sensor 10 while the respective sensing lines 14 are excited with respective ones of the excitation frequencies 52 in the set 50 of excitation frequencies 52.

Selecting the excitation frequencies 52 to be used for exciting the selected sensing lines 14 comprises, in at least one embodiment, choosing individual excitation frequencies 52 from among a set 50 of excitation frequencies 52 to minimize a frequency range spanned by the selected excitation frequencies 52, e.g., to reduce the needed sampling frequency for a corresponding reduction in power consumption.

In at least one embodiment, choosing individual excitation frequencies 52 from among a set of excitation frequencies 52 comprises choosing excitation frequencies 52 to minimize or otherwise reduce the processing time required for frequency-domain transformations performed for the transform-based reading of the touch sensor 10. Consider a first example scenario where the number of sensing lines 14 to be excited is four adjacent lines of the touch surface 12 and the overall frequency range spanned by the chosen excitation frequencies 52 is 100 kHz, and the regular frequency-domain transformation produces 1 bin per 1 kHz, resulting in 100 bins. Given that only four sensing lines 14 are excited for the read, the selected excitation frequencies can be picked at 25 kHz frequency spacing and the frequency-domain transformation can be adjusted to produce only four bins at the specific frequencies instead of the usual 100 bins. Doing so reduces processing time and power consumption.

In another scenario, the spectrum might be quite noisy, and a higher frequency-domain transformation resolution would be needed (e.g., 1 bin every 100 Hz) for better representation of the touch input, the number of bins will be increased, especially around the excitation frequencies 52 used in the reading, at the expense of processing time and power consumption.

Selecting the excitation frequencies 52 to be used for exciting the selected sensing lines 14 comprises, in at least one embodiment, identifying candidate excitation frequencies 52 from among a set 50 of excitation frequencies 52, based on noise measurements associated with respective excitation frequencies 52 in the set 50, and limiting selection consideration to the candidate excitation frequencies 52. That is, for any particular selection strategy or combination of selection strategies, the excitation frequencies 52 that are considered to be "available" for selection may be restricted, on the basis of noise measurements.

In at least one embodiment of the method 700, the host signaling 70 is dynamic. Correspondingly, determining the read configuration 80 comprises adapting the read configuration 80 responsive to any one or more of the following: the touch targets 68 changing, touch-detection requirements of the touch targets 68 changing, or a touch-target focus changing.

Figure 8:
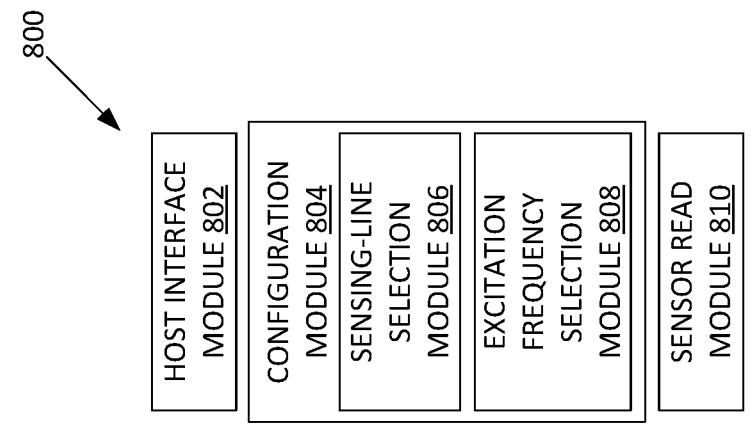
FIG. 8 is a block diagram of an apparatus configured for interfacing with a touch sensor, according to an embodiment.

FIG. 8 illustrates one embodiment of an apparatus 40 configured for interfacing with a touch sensor 10. The apparatus 40 comprises a set 800 of modules, also referred to as processing units, which may be realized as logical or functional circuitry instantiated using underlying physical circuitry, e.g., one or more microprocessors and supporting clocking and memory circuitry.

The modules 800 include a host interface module 802 that is configured to receive host signaling 70 from host processing circuitry 62 of a host system 60, the host signaling 70 indicating touch targets 68 for respective software applications 66 running on the host system 60, and each touch target 68 being a respective area of a touch surface 12 of a touch sensor 10. A configuration module 804 is configured to determine a read configuration 80 for transform-based reading of the touch sensor 10, in dependence on the indicated touch targets 68. The configuration module 804 at least logically includes a sensing-line selection module 806 that is configured to select sensing lines 14 of the touch surface 12 to be excited for detecting touch inputs to the touch targets 68, and an excitation-frequency selection module 808 that is configured to select excitation frequencies 52 to be used for exciting the selected sensing lines 14. Further, the set 800 of modules includes a sensor read module 810 that is configured to read the touch sensor 10 based on controlling reading circuitry 46 according to the read configuration 80, the reading circuitry 46 integrated or associated with the processing circuitry 42.

Figure 9:
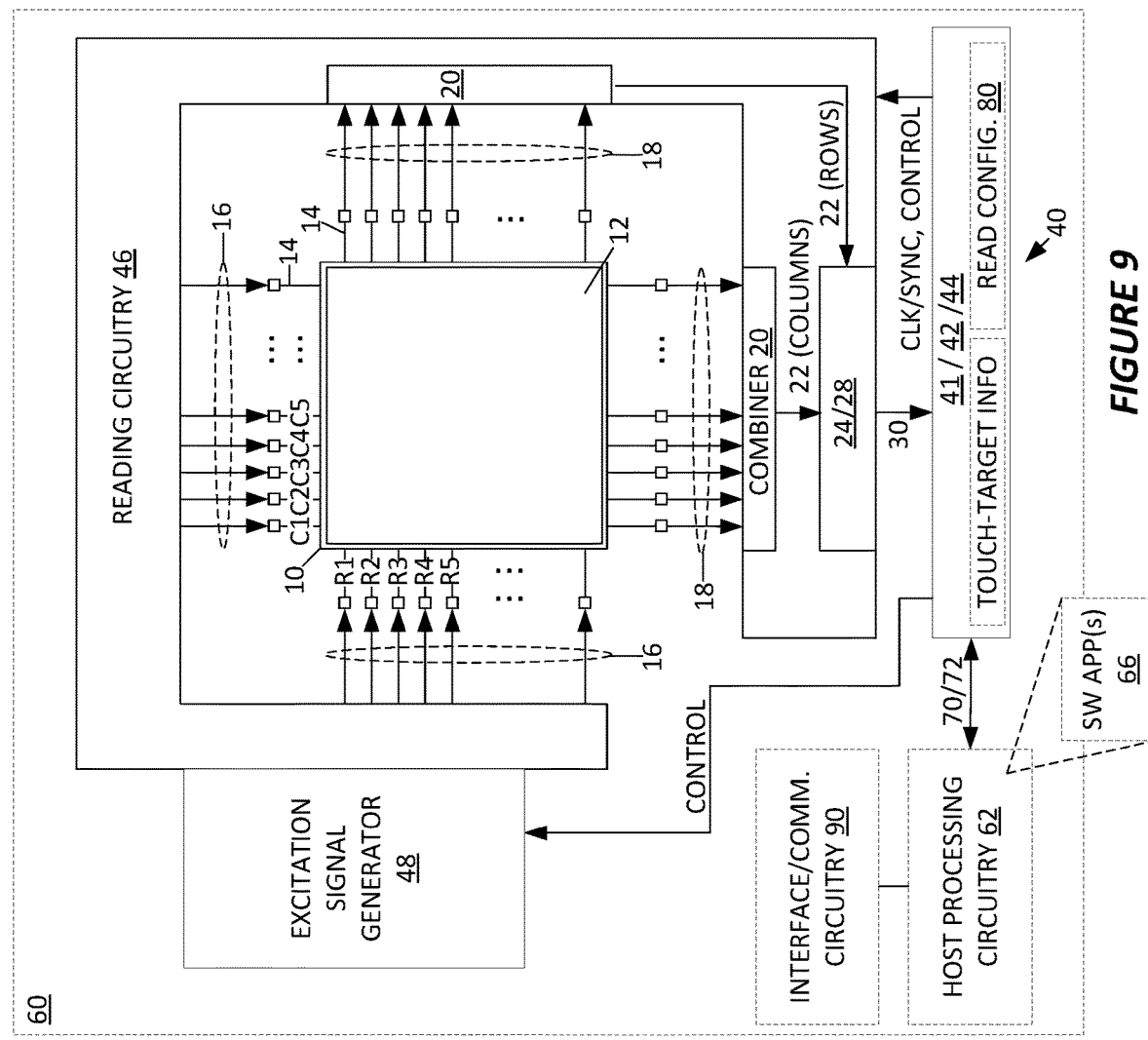
FIGS. 9 and 10 are block diagrams of an apparatus configured for interfacing with a touch sensor, according to another embodiment.

FIG. 9 depicts example details for a host system 60 that includes the apparatus 40 and reading circuitry 46, for interfacing a touch sensor 10 with host processing circuitry 62. Here, an overall set of sensing lines 14 of the touch surface 12 is arranged in a row/column arrangement, with "R" designating given rows and "C" designating given columns. That is, some sensing lines 14 are row sensing lines 14 and some are column sensing lines 14.

In an example implementation with respect to the depicted arrangement, the apparatus 40 reads the touch sensor 10 by performing a row read and a column read at different times and using the sensing value(s) 30 resulting from the row read and the sensing value(s) 30 resulting from the column read to detect and locate touch inputs to the touch surface 12. To this end, the apparatus 40 controls the reading circuitry 46 to excite selected row sensing lines 14 using selected excitation frequencies 52, and the combiner 20 combines the resulting sensing signals 18 to obtain a combined sensing signal 22 with respect to the rows, which is then digitized by the ADC circuitry 24 and frequency-domain transformed by the FDT circuitry 28 to produce row sensing values 30. The same process repeats with respect to the columns to obtain column sensing values 30.

Here, it should be noted that the frequency-domain transform may be applied twice, once to obtain sensing values 30 for row-oriented sensing lines 14 and again to obtain sensing values 30 for column-oriented sensing lines 14. Such an approach allows excitation frequencies to be reused as between row sensing and column sensing. Alternatively, even though the row sensing and column sensing are still performed at different times, the excitation frequencies 52 used for row excitation are different than those used for column excitation. Although this approach requires more excitation frequencies 52, it allows the digitized samples of the combined sensing signal 22 obtained for the rows to be frequency-domain transformed along with the digitized samples of the combined sensing signal 22 obtained for the columns. Here, it will be appreciated that the ADC circuitry 24 or the FDT circuitry 28 in one or more embodiments contains one or more buffers, for such buffering activities.

Another item illustrated in FIG. 9 is interface/communication circuitry 90, which is included in the host system 60 in one or more embodiments. Such circuitry comprises, for example, a wireless communication interface operative to couple the host system 60 to a Wireless Local Area Network (WLAN) or Wide Area Network (WAN), such as a cellular communication network.

Figure 10:
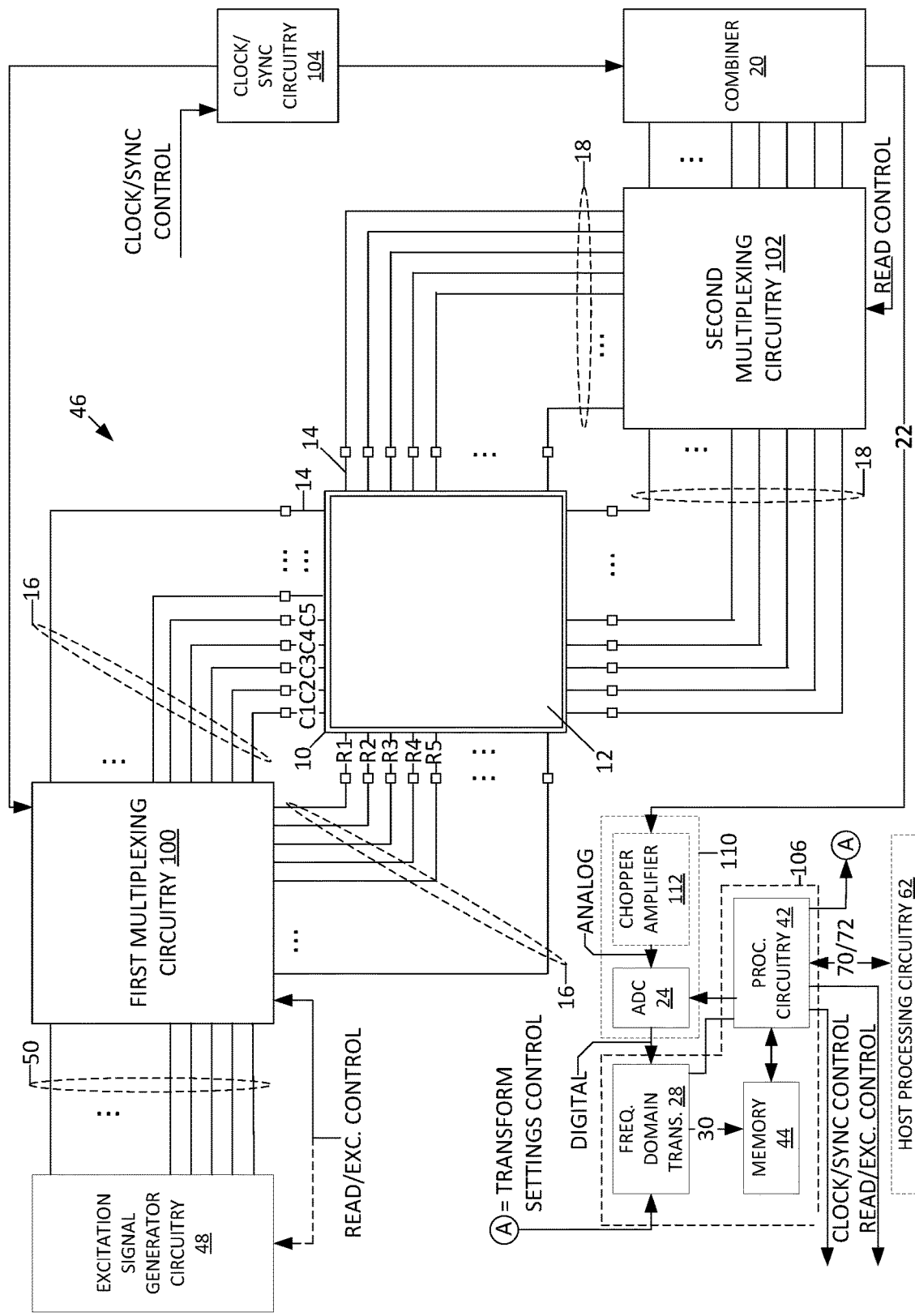

FIG. 10 depicts example implementation details for the reading circuitry 46. First multiplexing circuitry 100 operates under control by the processing circuitry 42 of the apparatus 40, to perform row excitation or column excitation. Second multiplexing circuitry 102 operates in cooperation with the first multiplexing circuitry to provide either row sensing signals 18 or column sensing signals 18 to the combiner 20. That is, when the first multiplexing circuitry 100 performs row excitation, the combiner 20 receives row sensing signals 18 for combining into a combined sensing signal 22 that has an excitation-frequency component corresponding to every excitation frequency 52 used in the row excitation. When the first multiplexing circuitry 100 performs column excitation, the combiner 20 receives column sensing signals 18 for combining into a combined sensing signal 22 that has an excitation-frequency component corresponding to every excitation frequency 52 used in the column excitation.

Clocking/synchronization circuitry 104 of the reading circuitry 46 provides synchronized operation of the first and second multiplexing circuitry 100 and 102 and may operate responsive to the processing circuitry 42 of the apparatus 40, e.g., on a triggered or cycling basis. The processing circuitry 42 is included in digital-domain circuitry 106 that includes the FDT 28 and the memory 44, e.g., for holding sensing values 30 or digitized samples output from the ADC 24 for combined sensing signals 22. The ADC 24 belongs to analog-domain circuitry 110, that may include a chopper amplifier 112 in one or more embodiments, for conditioning the combined sensing signal(s) 22 incoming to the ADC circuitry 24 for digitization. Particularly, the chopper amplifier 112 may provide noise reduction in at least some scenarios.

Broadly, an apparatus 40 according to one or more embodiments is configured for interfacing with a touch sensor 10. The apparatus 40 comprises interface circuitry 41 and processing circuitry 42. The processing circuitry 42 is configured to receive, via the interface circuitry 41, host signaling 70 from host processing circuitry 62 of a host system 60. The host signaling 70 indicates touch targets 68 for respective software applications 66 running on the host system 60, each touch target 68 being a respective area of a touch surface 12 of the touch sensor 10.

The processing circuitry 42 is further configured to determine a read configuration 80 for transform-based reading of the touch sensor 10, in dependence on the indicated touch targets 68, including selecting sensing lines 14 of the touch surface 12 to be excited for detecting touch inputs to the touch targets 68, and selecting excitation frequencies 52 to be used for exciting the selected sensing lines 14. Still further, the processing circuitry 42 is configured to read the touch sensor 10 based on controlling reading circuitry 46 according to the read configuration 80, the reading circuitry 46 being integrated or associated with the processing circuitry 42.

The processing circuitry 42 comprises fixed circuitry or programmatically configured circuitry or a mix of both. For example, the apparatus 40 includes one or more microprocessors, Digital Signal Processors (DSPs), Application Specific Integrated Circuits (ASICs), Field Programmable Gate Arrays (FPGAs), Complex Programmable Logic Devices (CPLDs), or other arrangement of digital processing circuitry. In at least one embodiment, the processing circuitry 42 is realized based on the execution of stored computer program instructions.

For example, the processing circuitry 42 comprises one or more microprocessors that are specially adapted to carry out the operations attributed herein to the processing circuitry 42, based on the execution of computer program instructions from one or more computer programs stored in the memory 44 of the apparatus 40. To this end, the memory 44 may comprise more than one type of memory or more than one memory device. More broadly, the memory 44 may comprise one or more storage devices and may include more than one type of storage device, such as volatile and non-volatile memory devices.

The processing circuitry 42 in at least one embodiment is configured to receive touch-target indications on a per-application basis, for the respective software applications 66 running on the host system 60 and determine the read configuration 80 according to an aggregation of indicated per-application touch targets 68 received over time.

The processing circuitry 42 in at least one embodiment is configured to receive the host signaling 70 as changing indications of touch targets 68, and determine the read configuration 80 dynamically, responsive to the changing indications of touch targets 68.

The processing circuitry 42 in at least one embodiment is configured to receive, as the host signaling 70, indications from the host processing circuitry 62 regarding touch targets 68 currently in use by software applications 66 running on the host system 60 and determining the read configuration 80 according to the touch targets 68 currently in use.

For selecting the sensing lines 14 of the touch surface 12 to be excited, the processing circuitry 42 in one or more embodiments is configured to select all sensing lines 14 involved with the touch targets 68 or select fewer than all involved sensing lines 14, in dependence on touch-resolution requirements associated with respective ones of the touch targets 68 and a relative positioning of the touch targets 68 on the touch surface 12.

For selecting the excitation frequencies 52 to be used for exciting the selected sensing lines 14, the processing circuitry 42 in one or more embodiments is configured to select as many excitation frequencies 52 as there are selected sensing lines 14 to be simultaneously excited, or select fewer excitation frequencies 52 than there are selected sensing lines 14 to be simultaneously excited, in dependence on touch-resolution requirements associated with respective ones of the touch targets 68 and a relative positioning of the touch targets 68 on the touch surface 12.

The processing circuitry 42 in at least one embodiment is configured to determine the read configuration 80 in further dependence on touch-detection requirements associated with the touch targets 68, the touch-detection requirements including at least one of touch-resolution requirements, touch-responsive requirements, or touch-type requirements.

For selecting the excitation frequencies 52 to be used for exciting the selected sensing lines 14, the processing circuitry 42 in one or more embodiments is configured to choose individual excitation frequencies 52 from among a set 50 of excitation frequencies 52, in dependence on noise or interference measurements associated with respective ones of the excitation frequencies 52 in the set 50 of excitation frequencies 52. Here, the processing circuitry 42 is configured to measure noise or interference present in sensing signals 18 to obtain the noise or interference measurements, the sensing signals 18 being output from respective sensing lines 14 of the touch sensor 10 while the respective sensing lines 14 are excited with respective ones of the excitation frequencies 52 in the set 50 of excitation frequencies 52.

In one or more embodiments, for selecting the excitation frequencies 52 to be used for exciting the selected sensing lines 14, the processing circuitry 42 is configured to choose individual excitation frequencies 52 from among a set 50 of excitation frequencies 52 to minimize a frequency range spanned by the selected excitation frequencies 52. In at least one embodiment, for selecting the excitation frequencies 52 to be used for exciting the selected sensing lines 14, the processing circuitry 42 is configured to identify candidate excitation frequencies 52 from among a set 50 of excitation frequencies 52, based on noise measurements associated with respective excitation frequencies 52 in the set 50, and select particular ones among the candidate excitation frequencies 52, to minimize a frequency range spanned by the selected excitation frequencies 52.

In at least one embodiment, the host signaling 70 is dynamic and the processing circuitry 42 is configured to adapt the read configuration 80 responsive to any one or more of the following: the touch targets 68 changing, touch-detection requirements of the touch targets 68 changing, or a touch-target focus changing.

The apparatus 40 in one or more embodiments comprises an Integrated Circuit (IC) or an IC assembly. In at least one embodiment, the apparatus 40 includes the reading circuitry 46. For example, the apparatus 40 comprises a Multi-Chip Module (MCM) or a System-On-a-Chip (SoC) that includes ICs or modules embodying the interface circuitry 41, the processing circuitry 42, the reading circuitry 46, and the excitation signal generator 48. The apparatus 40 in such embodiments may be regarded as an integrated touch-sensor IC that provides convenient interfacing between host processing circuitry 62 and a touch sensor 10, with the multiplicity of advantages that come from transform-based reading of the touch sensor 10 and the ability to tailor the particular sensing line(s) 14 that are excited and the particular excitation frequencies 52 that are used for excitement, in a manner that accounts for the touch-detection need of active or running software application(s) 66 while minimizing power consumption.

Figure 11:
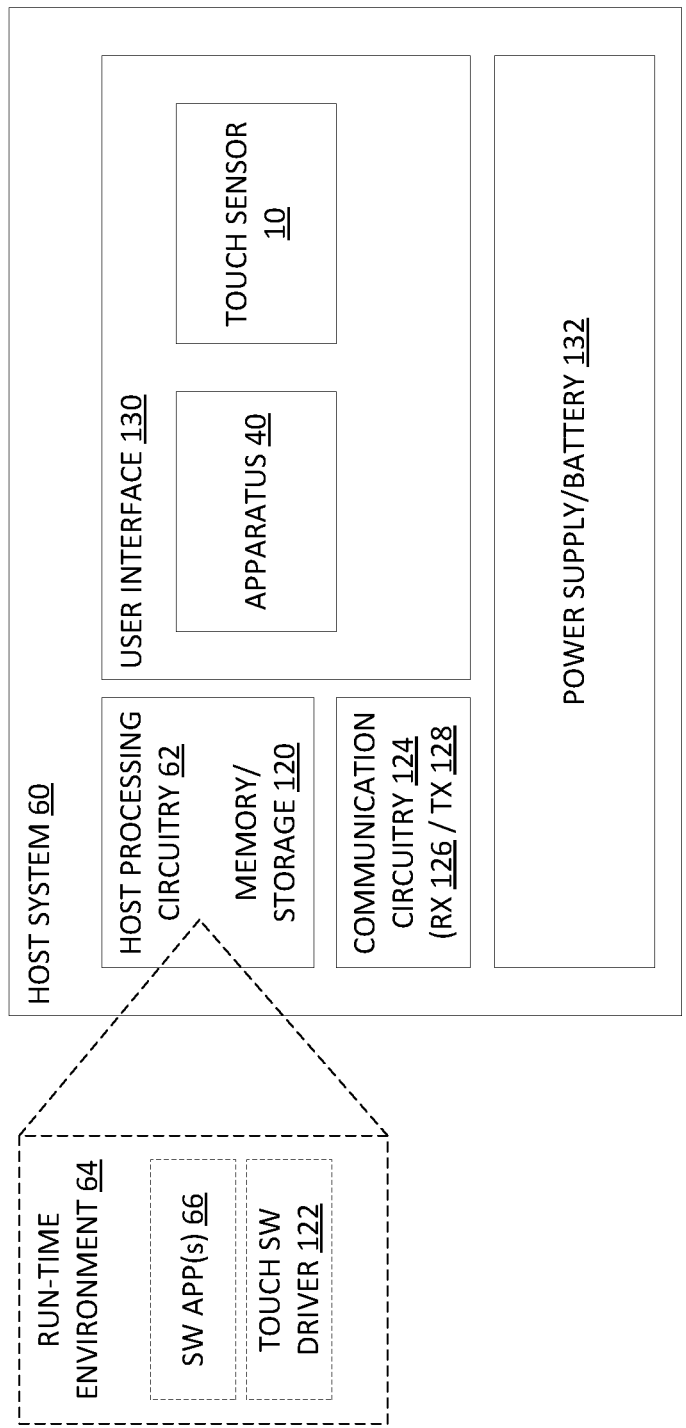
FIG. 11 is a block diagram of a host device according to another example embodiment.

FIG. 11 illustrates another example of a host system 60, which includes host processing circuitry 62 and associated memory/storage 120. The host processing circuitry 62 provides a runtime environment 64, for execution of software applications 66 and a touch software driver 122 that provides for interfacing with the apparatus 40, which may be included in a user interface 130 of the host system 60, along with a touch sensor 10. The touch software driver 122 provides, for example, signaling or message formatting that comports with the protocol(s) implemented in the apparatus 40, for receiving touch-target information, touch-detection requirements, etc., and for transmitting touch-detection information to the host processing circuitry 62, e.g., touch locations, durations, touch types, gesture information, etc.

The example host system 60 further includes communication circuitry 124 that includes receiver circuitry 126 and transmitter circuitry 128. Such circuitry may provide wired or wireless-communications operations for the host system 60. Further elements of the host system 60 include a power supply 132, which may include a battery. Example host systems 60 include personal computing devices, such as tablets, touch-enabled laptops, smart phones, in-vehicle infotainment screens, kiosk systems or other point of sale or retail displays used for interaction, etc.

Figure 12:
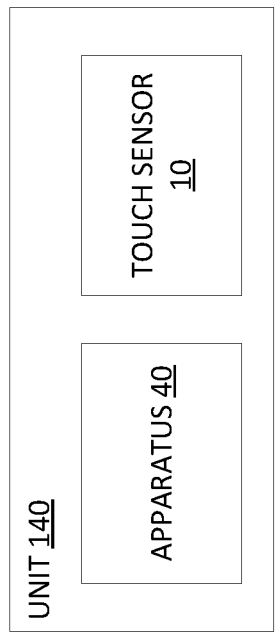
FIG. 12 is a block diagram of a unit comprising a touch sensor and an apparatus for reading the touch sensor, according to one embodiment.

FIG. 12 depicts a "unit" or assembly 140 that includes a touch sensor 10 and an implementation of the apparatus 40 configured for reading the touch sensor 10. For example, the touch sensor 10 is a capacitive touch screen and the apparatus 40 provides a power-efficient mechanism for reading the capacitive touch screen. Of course, other types or variations of touch sensor 10 may be included in the unit 140, which may be provided for incorporation into various types of electronic systems or devices.

Figure 13:
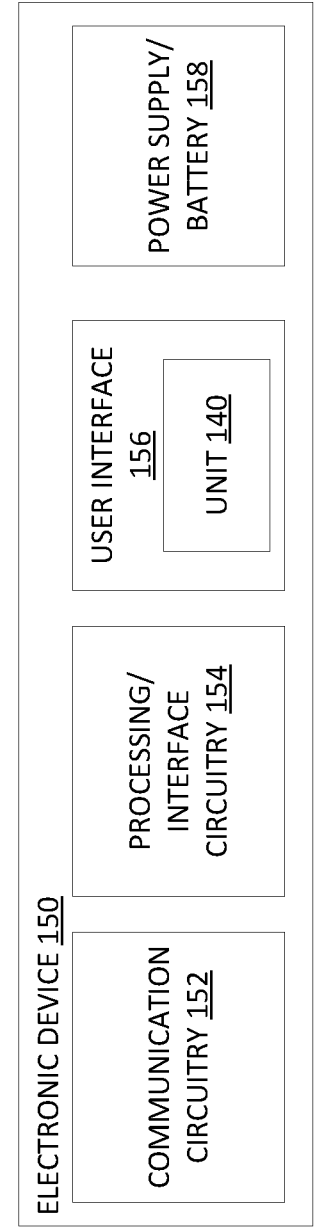
FIG. 13 is a block diagram of a mobile communication device according to one embodiment, wherein the device includes the unit of FIG. 12.

FIG. 13 illustrates one example of such incorporation, where the unit 140 forms a part of an electronic device 150. As an example, the electronic device 150 comprises a wireless communication terminal or other mobile communication device, such as a smart phone, tablet, or other computing device that includes the apparatus 40 for interfacing with a touch sensor 10. According to terminology used by the Third Generation Partnership Project (3GPP), the electronic device 150 may be a "User Equipment" or "UE".

The electronic device 150 may be understood as an example host system 60. In the illustrated embodiment, the electronic device 150 includes communication circuitry 152, processing and interface circuitry 154, a user interface 156 that includes the unit 140, and a power supply 158, which may include a battery. The electronic device 150 is, for example, configured for operation in a cellular network or other Wide Area Network (WAN), such as in a wireless communication network that operates according to 3GPP specifications.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method performed by an apparatus, the method comprising:
receiving host signaling from host processing circuitry, indicating touch targets for respective software applications running on a host system, each touch target being a respective area of a touch surface of a touch sensor and the host signaling indicating touch detection requirements corresponding to the touch targets indicated for the respective software applications;
maintaining a data structure that represents a current set of touch targets, from among the indicated touch targets, the data structure indicating the touch detection requirements corresponding to the current set of touch targets;
determining a read configuration for the touch sensor according to the current set of touch targets and the corresponding touch-detection requirements, as represented in the data structure, the read configuration defining which sensing lines of the touch sensor are selected for excitement and which excitation frequencies are used for exciting the selected sensing lines, for detecting touch inputs to respective ones among the current set of touch targets using frequency-domain transformations; and reading the touch sensor according to the read configuration.

2. The method of claim 1, wherein maintaining the data structure comprises updating the data structure responsive to receiving host signaling indicating a change in which software application among the respective software applications is active for touch inputs.

3. The method of claim 1, wherein receiving the host signaling comprises receiving changing indications of the current set of touch targets, and updating the data structure responsive to the changing indications.

4. The method of claim 1, wherein determining the read configuration includes setting the number of excitation frequencies used in relation to the number of sensing lines selected for excitation in dependence on the touch-detection requirements corresponding to the current set of touch targets.

5. The method of claim 1, wherein determining the read configuration includes selecting for excitation fewer than all sensing lines involved with the current set of touch targets or selecting fewer excitation frequencies than there are selected sensing lines, in dependence on touch-resolution requirements associated with respective ones among the current set of touch targets and a relative positioning of respective ones among the current set of touch targets on the touch surface.

6. The method of claim 1, wherein selecting which excitation frequencies are used for exciting the selected sensing lines comprises selecting as many excitation frequencies as there are selected sensing lines to be simultaneously excited, or selecting fewer excitation frequencies than there are selected sensing lines to be simultaneously excited, in dependence on touch-resolution requirements associated with respective ones among the current set of touch targets and a relative positioning of respective ones among the current set of touch targets on the touch surface.

7. The method of claim 1, wherein selecting which excitation frequencies are used for exciting the selected sensing lines comprises choosing individual excitation frequencies from among a set of excitation frequencies, in dependence on noise or interference measurements associated with respective ones of the excitation frequencies in the set of excitation frequencies.

8. The method of claim 7, further comprising measuring noise or interference present in sensing signals to obtain the noise or interference measurements, the sensing signals being output from respective sensing lines of the touch sensor while the respective sensing lines are excited with respective ones of the excitation frequencies in the set of excitation frequencies.

9. The method of claim 1, wherein selecting which excitation frequencies are used for exciting the selected sensing lines comprises choosing individual excitation frequencies from among a set of excitation frequencies to minimize a frequency range spanned by the selected excitation frequencies.

10. The method of claim 1, wherein selecting which excitation frequencies are used for exciting the selected sensing lines comprises:

identifying candidate excitation frequencies from among a set of excitation frequencies, based on noise measurements associated with respective excitation frequencies in the set; and limiting consideration of which excitation frequencies are used to the candidate excitation frequencies.

11. An apparatus configured for interfacing with a touch sensor, the apparatus comprising processing circuitry configured to:

interface circuitry; and processing circuitry configured to:

receive, via the interface circuitry, host signaling from host processing circuitry of a host system, the host signaling indicating touch targets for respective software applications running on the host system, each touch target being a respective area of a touch surface of the touch sensor and the host signaling indicating touch detection requirements corresponding to the touch targets indicated for the respective software applications;

maintain a data structure that represents a current set of touch targets, from among the indicated touch targets, the data structure indicating the touch detection requirements corresponding to the current set of touch targets;

determine a read configuration for the touch sensor according to the current set of touch targets and the corresponding touch-detection requirements, as represented in the data structure, the read configuration defining which sensing lines of the touch sensor are selected for excitement and which excitation frequencies used for exciting the selected sensing lines, for detecting touch inputs to respective ones among the current set of touch targets using frequency-domain transformations; and read the touch sensor based on controlling reading circuitry according to the read configuration, the reading circuitry integrated or associated with the processing circuitry.

12. The apparatus of claim 11, wherein the processing circuitry is configured to maintain the data structure by updating the data structure responsive to receiving host signaling indicating a change in which software application among the respective software applications is active for touch input.

13. The apparatus of claim 11, wherein the processing circuitry is configured to receive the host signaling as changing indications of the current set of touch targets, and determine the read configuration dynamically, responsive to the changing indications of the current set of touch targets.

14. The apparatus of claim 11, wherein, with respect to determining the read configuration, the processing circuitry is configured to set the number of excitation frequencies used in relation to the number of sensing lines selected for excitation in dependence on the touch-detection requirements corresponding to the current set of touch targets.

15. The apparatus of claim 11, wherein, with respect to determining the read configuration, the processing circuitry is configured to select fewer than all sensing lines involved with the current set of touch targets or select fewer excitation frequencies than there are selected sensing lines, in dependence on touch-resolution requirements associated with respective ones among the current set of touch targets and a relative positioning of respective ones among the current set of touch targets on the touch surface.

16. The apparatus of claim 11, wherein, for selecting which excitation frequencies are used for exciting the selected sensing lines, the processing circuitry is configured to select as many excitation frequencies as there are selected sensing lines to be simultaneously excited, or select fewer excitation frequencies than there are selected sensing lines to be simultaneously excited, in dependence on touch-resolution requirements associated with respective ones of the touch targets and a relative positioning of respective ones among the current set of touch targets on the touch surface.

17. The apparatus of claim 11, wherein, for selecting which excitation frequencies are used for exciting the selected sensing lines, the processing circuitry is configured to choose individual excitation frequencies from among a set of excitation frequencies, in dependence on noise or interference measurements associated with respective ones of the excitation frequencies in the set of excitation frequencies.

18. The apparatus of claim 11, wherein, for selecting which excitation frequencies are used for exciting the selected sensing lines, the processing circuitry is configured to choose individual excitation frequencies from among a set of excitation frequencies to reduce the processing time required for frequency-domain transformations performed for the transform-based reading of the touch sensor.

19. The apparatus of claim 11, wherein, for selecting which excitation frequencies are used for exciting the selected sensing lines, the processing circuitry is configured to:
   identify candidate excitation frequencies from among a set of excitation frequencies, based on noise measurements associated with respective excitation frequencies in the set; and
   limit selection consideration to the candidate excitation frequencies.

20. The apparatus of claim 11, wherein the apparatus comprises an Integrated Circuit (IC) or an IC assembly.

21. The apparatus of claim 20, wherein the apparatus comprises an IC assembly that includes the reading circuitry.

22. An electronic device, the electronic device comprising:
   a touch sensor comprising a touch surface having sensing lines for sensing touch inputs to the touch surface;
   host processing circuitry of a host system that is configured for execution of one or more software applications that use the touch sensor as a control input; and
   an apparatus configured to interface the host processing circuitry with the touch sensor, the apparatus comprising:
      interface circuitry; and
      processing circuitry configured to:
         receive, via the interface circuitry, host signaling from the host processing circuitry of the host system, the host signaling indicating touch targets for respective software applications running on the host system, each touch target being a respective area of a touch surface of the touch sensor and the host signaling further indicating touch detection requirements corresponding to the touch targets indicated for the respective software applications;
         maintain a data structure that represents a current set of touch targets, from among the indicated touch targets, the data structure indicating the touch detection requirements corresponding to the current set of touch targets;
         determine a read configuration for the touch sensor according to the current set of touch targets and the corresponding touch-detection requirements, as represented in the data structure, the read configuration defining which sensing lines of the touch sensor are selected for excitement and which excitation frequencies used for exciting the selected sensing lines, for detecting touch inputs to respective ones among the current set of touch targets using frequency-domain transformations; and
         read the touch sensor based on controlling reading circuitry according to the read configuration, the reading circuitry integrated or associated with the processing circuitry.

* * * * *